US012320517B2

(12) United States Patent (10) Patent No.: US 12,320,517 B2
Qiao et al. (45) Date of Patent: Jun. 3, 2025

(54) LENS AND LIGHT SOURCE MODULE

(71) Applicants: OPPLE LIGHTING CO., LTD., Shanghai (CN); SUZHOU OPPLE LIGHTING CO., LTD., Suzhou (CN)

(72) Inventors: Shengjie Qiao, Suzhou (CN); Guolong Ni, Suzhou (CN); Guobao Zhang, Suzhou (CN)

(73) Assignees: OPPLE LIGHTING CO., LTD., Shanghai (CN); SUZHOU OPPLE LIGHTING CO., LTD., Suzhou (CN)

( * ) Notice: Subject to any disclaimer, the term of this patent is extended or adjusted under 35 U.S.C. 154(b) by 23 days.

(21) Appl. No.: 17/565,074

(22) Filed: Dec. 29, 2021

(65) Prior Publication Data

US 2022/0120409 A1 Apr. 21, 2022

Related U.S. Application Data

(63) Continuation of application No. PCT/CN2020/122058, filed on Oct. 20, 2020.

(30) Foreign Application Priority Data

Nov. 8, 2019 (CN) ........................ 201921939179.1

(51) Int. Cl.
*F21V 5/04* (2006.01)
*F21V 17/10* (2006.01)

(52) U.S. Cl.
CPC ................ *F21V 5/04* (2013.01); *F21V 17/10* (2013.01)

(58) Field of Classification Search
CPC .. G02B 3/0056; G02B 3/0075; G02B 3/0037; G02B 3/0006; G02B 3/005; F21V 5/007; B29D 11/00298

(Continued)

(56) References Cited

U.S. PATENT DOCUMENTS 3,668,381 A * 6/1972 Schwartz .................. F21V 5/02 362/330
8,242,669 B2 * 8/2012 Qiu ......................... F21V 5/007 362/264

(Continued)

FOREIGN PATENT DOCUMENTS

CN 202469876 U 10/2012
CN 206522751 U 9/2017

(Continued)

OTHER PUBLICATIONS

International Search Report of PCT Application No. PCT/CN2020/122058 dated Jan. 18, 2021 with English translation, (4p).

*Primary Examiner* — Ismael Negron
(74) *Attorney, Agent, or Firm* — Arch & Lake LLP; Hao Tan; Shen Wang

(57) ABSTRACT

The lens includes a suction portion and at least two light distribution portions; each of the light distribution portions is configured to distribute light for a light emitting unit independently, and a plurality of light distribution portions are arranged around the suction portion with the suction portion as a center and are fixedly connected with the suction portion; each of the light distribution portions is provided with a light source cavity, a bonding surface and a light exiting surface, and the bonding surface and the light exiting surface face are away from each other, the light source cavity is a recess recessed in a direction from the bonding surface to the light exiting surface, the suction portion is provided with a suction surface, and the light exiting surface and the suction surface face are toward a same direction.

10 Claims, 6 Drawing Sheets

(58) Field of Classification Search
USPC .................................... 362/330, 360, 311.15
See application file for complete search history.

(56) References Cited

U.S. PATENT DOCUMENTS

| | | | | | |
|---|---|---|---|---|---|
| 8,573,809 | B2 * | 11/2013 | Nakamura | F21V 5/007 | 362/249.02 |
| 8,704,259 | B2 * | 4/2014 | Beneitez | G02B 3/0062 | 362/256 |
| 9,626,884 | B2 * | 4/2017 | Freeman | F21V 5/007 | |
| 9,939,125 | B2 * | 4/2018 | Donato | F21V 5/007 | |
| 10,337,718 | B2 * | 7/2019 | Chen | F21V 5/007 | |
| 2007/0097512 | A1 * | 5/2007 | Toyoda | G02B 3/0068 | 359/626 |
| 2009/0268459 | A1 * | 10/2009 | Chang | G02B 3/0056 | 362/240 |
| 2011/0280020 | A1 * | 11/2011 | Chen | F21V 5/10 | 362/294 |
| 2015/0260376 | A1 * | 9/2015 | Joo | F21V 5/007 | 362/322 |
| 2017/0167668 | A1 * | 6/2017 | Uenoyama | F21V 17/10 | |
| 2018/0275319 | A1 * | 9/2018 | Tagawa | G02B 3/0075 | |

FOREIGN PATENT DOCUMENTS

| | | | |
|---|---|---|---|
| CN | 207455351 | U | 6/2018 |
| CN | 208342170 | U | 1/2019 |
| CN | 210717380 | U | 6/2020 |
| JP | 2014165142 | A | 9/2014 |

* cited by examiner

LENS AND LIGHT SOURCE MODULE

CROSS-REFERENCE TO RELATED APPLICATIONS

This application is based upon and claims the priority of PCT patent application No. PCT/CN2020/122058 filed on Oct. 20, 2020 which claims priority to the Chinese patent application No. 201921939179.1 filed on Nov. 8, 2019, the entire contents of which are hereby incorporated by reference herein for all purposes.

TECHNICAL FIELD

The present disclosure relates to a technical filed of lighting, and particularly relates to a lens and a light source module.

BACKGROUND

With the improvement of people's living standard, lighting devices have become an indispensable electrical appliance in people's daily life, which can provide lighting for the environment. In order to improve the lighting effect, lenses are widely used in the current lighting devices to distribute light for light emitting units.

SUMMARY

The examples of the present disclosure provide a lens and a light source module.

In the first aspect, the examples of the present disclosure provide a lens. The lens may include a suction portion and at least two light distribution portions.

Each of the light distribution portions may be configured to distribute light for a light emitting unit independently, and a plurality of light distribution portions may be arranged around the suction portion with the suction portion as a center and are fixedly connected with the suction portion.

Each of the light distribution portions may be provided with a light source cavity, a bonding surface and a light exiting surface, and the bonding surface and the light exiting surface face may be away from each other, the light source cavity may be a recess recessed in a direction from the bonding surface to the light exiting surface, the suction portion may be provided with a suction surface, and the light exiting surface and the suction surface face may be toward a same direction.

In the second aspect, the examples of the present disclosure provide a light source module. The light source module may include a light source board, light emitting units and the lens as described above, the light emitting units may be arranged on the light source board in groups, and the light emitting units in each group are in one-to-one correspondence with the light distribution portions in one lens, and the bonding surfaces may be attached to the light source board and the light emitting units in a same group may be respectively placed in different light source cavities.

It is to be understood that both the foregoing general description and the following detailed description are exemplary and explanatory only and are not restrictive of the present disclosure.

BRIEF DESCRIPTION OF THE DRAWINGS

The accompanying drawings described herein are intended to provide a further understanding of the present disclosure, and constitute a part of the present disclosure, illustrative examples of the present disclosure and together with the description serve to explain the present disclosure, and constitute no undue limitation to the present disclosure. In the accompanying drawings.

DETAILED DESCRIPTION

Figure 1:
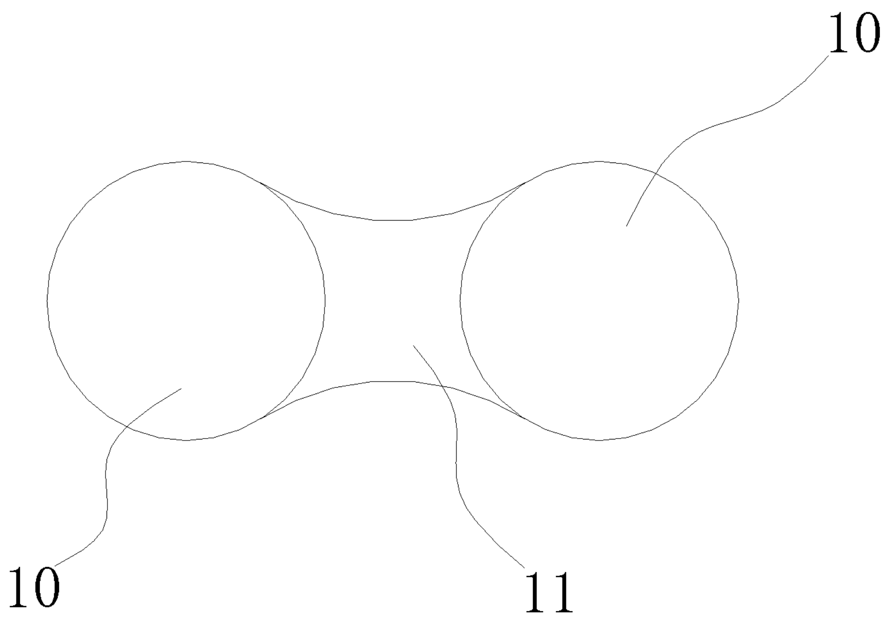
FIG. 1 is a top structural view of a lens provided with two light distribution portions disclosed in the examples of the present disclosure.

In order to make objectives, technical details and advantages of the present disclosure more clear, the technical solutions of the present disclosure will be described in a clearly and fully understandable way in connection with the examples and the corresponding drawings of the present disclosure. Apparently, the described examples are just a part but not all of the examples of the present disclosure. Based on the examples in the present disclosure, those skilled in the art can obtain other example(s), without any inventive work, which should be within the protection scope of the present disclosure.

Description of numerals in this disclosure may include:

1—lens, 10—light distribution portion, 100—light source cavity, 101—light incident surface, 102—bonding surface, 103—light exiting surface, 104—base, 105—light distribution cover; 106—connection edge, 11—suction portion, 110—suction surface, 12—positioning element, 13—adhesive receiving groove, 2—light emitting unit, 202—bonding surface, 204—base, 21—suction portion, 210—suction surface, 3—light source board, 33—light source board.

Sometimes, there are two types of lenses being used, the first type is to equip each light emitting unit with a lens separately, and the second type is to equip a row or a circle of light emitting units with a stretching lens. These two lens types have different light distribution effects, which can be selected according to needs.

For the lens of the first type, it is usually sucked by a suction nozzle and attached to the surface of a light source board during assembly. The number of lenses in a light source module usually ranges from dozens to hundreds, and each lens needs to be sucked independently, which takes a lot of time.

The example of the present disclosure discloses a lens 1, which includes at least two light distribution portions 10 and a suction portion 11, 21, as shown in FIGS. 1-5 and FIGS. 7-9. Each light distribution portion 10 can independently distribute light for one light emitting unit. The light distribution portion 10 is provided with a light source cavity 100, a bonding surface 102, 202 and a light exiting surface 103, and the bonding surface 102, 202 and the light exiting surface 103 face away from each other. The light source cavity 100 is a recess recessed in a direction from the bonding surface 102, 202 to the light exiting surface 103, and the light source cavity 100 can receive a light emitting unit. The inner wall of the light source cavity 100 serves as a light incident surface 101. After the light enters the light distribution portion 10 from the incident surface 101, it will be adjusted and emitted by the light exiting surface 103 to form an output light. Upon passing through the incident surface 101 and the light exiting surface 103, the light will be refracted so as to change its propagation direction, thus forming the required light emitting effect.

The suction portion 11, 21 is provided with a suction surface 110, 210 configured to be sucked by a suction nozzle. A plurality of light distribution portions 10 are arranged around the suction portion 11, 21 with the suction portion 11, 21 as a center, and all of the light distribution portions 10 are fixedly connected with the suction portion 11, 21. The suction surface 110, 210 has the same orientation as the light exiting surface 103 of the light distribution portion 10.

Figure 6:
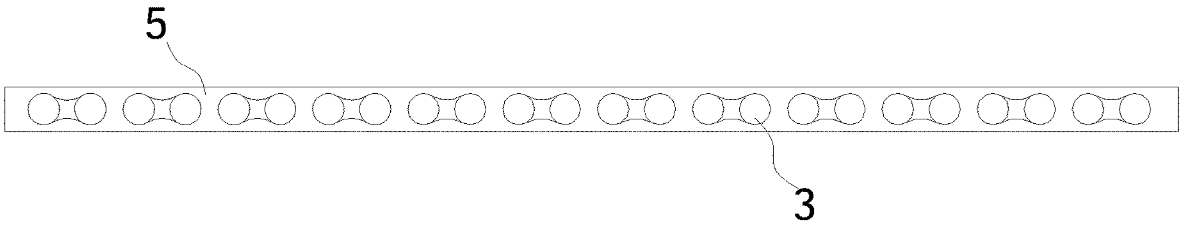
FIG. 6 is a top structural view of a light source module equipped with the lens shown in FIGS. 1-5 disclosed in the examples of the present disclosure.
Figure 7:
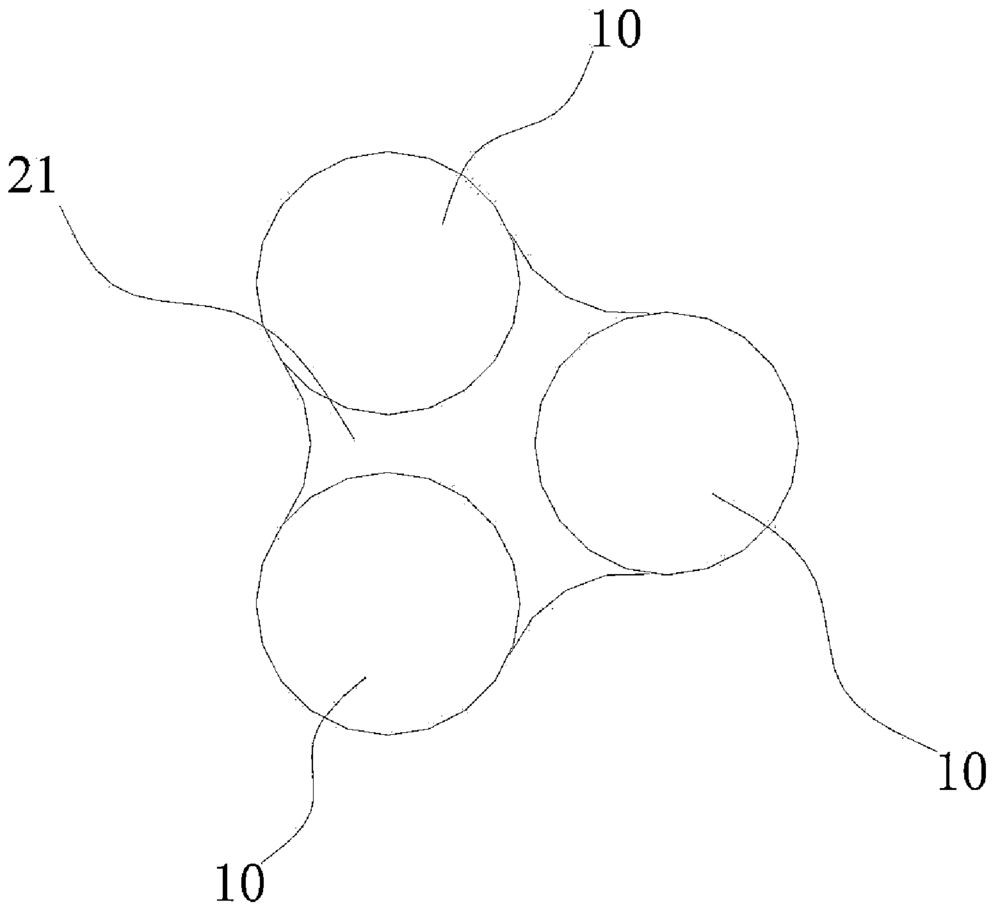
FIG. 7 is a top structural view of a lens provided with three light distribution portions disclosed in the examples of the present disclosure.
Figure 8:
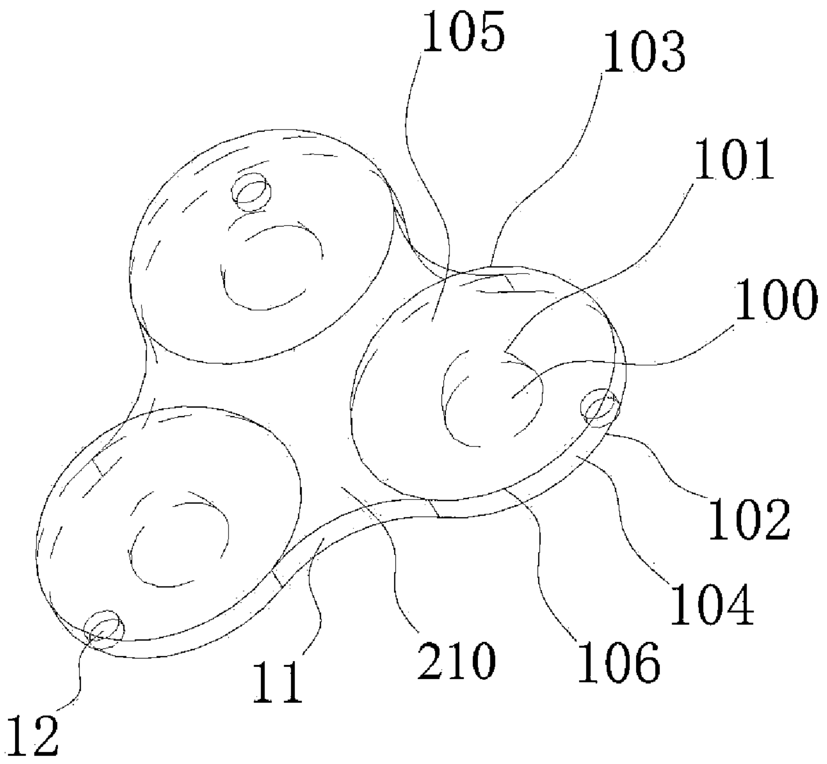
FIG. 8 is a perspective structural view of the lens shown in FIG. 7 with a perspective effect.
Figure 9:
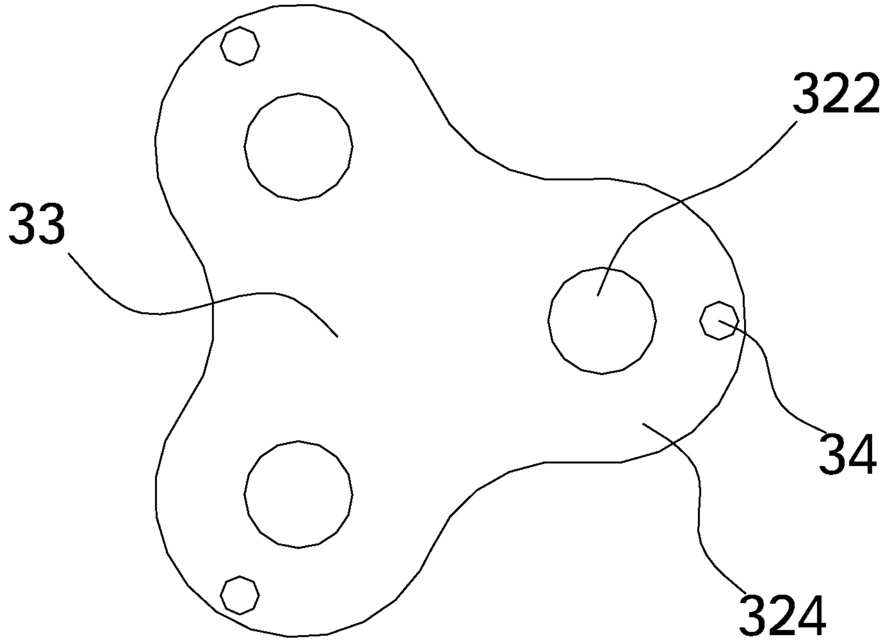
FIG. 9 is a bottom structural view of the lens shown in FIG. 7.
Figure 10:
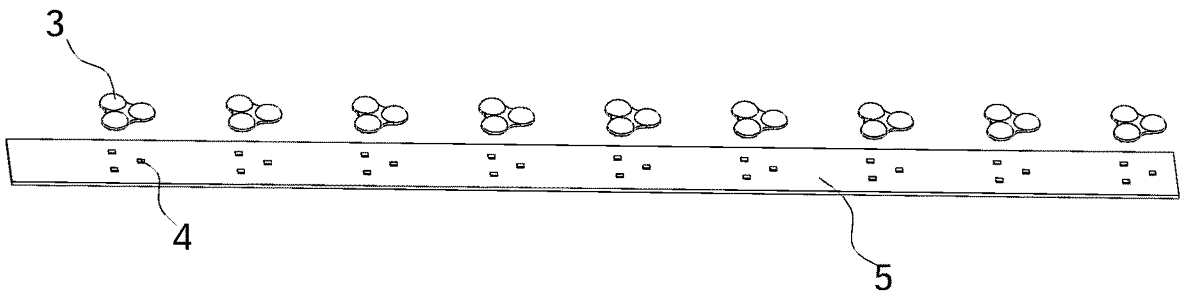
FIG. 10 is an exploded structural view of a light source module equipped with the lens shown in FIGS. 7-9 disclosed in the examples of the present disclosure, and the groups of the light emitting units are arranged in a straight line.
Figure 11:
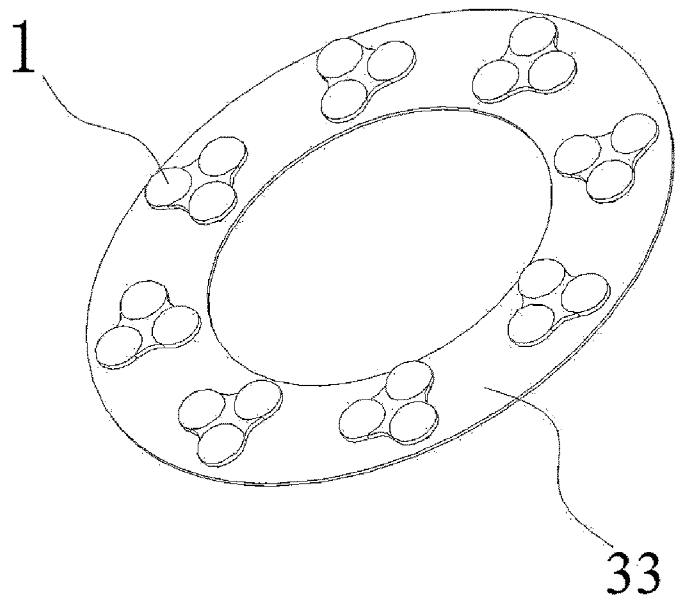
FIG. 11 is a perspective structural view of a light source module equipped with the lens shown in FIGS. 7-9 disclosed in the examples of the present disclosure, and the groups of the light emitting units are arranged in a circular shape.

As shown in FIGS. 6, 10 and 11, when assembling a light source module, firstly, the light emitting units 2 are attached and fixed on the light source board 3, 33. The light emitting units 2 are in groups, and the number of light emitting units included in each group is the same as the number of light distribution portions 10 included in the lens 1. The light emitting units 2 in the group are subjected to light distribution by one lens 1. The arrangement of the light emitting units 2 in each group on the light source board 3, 33 should be in one-to-one correspondence with the arrangement of the light distribution portions 10, or the arrangement of the light distribution portions 10 of each lens 1 should be in one-to-one correspondence with the light emitting units 2 in one group. All groups can be uniformly arranged in a straight line (see FIGS. 6 and 10) or in a circular ring (see FIG. 11). Then, the whole lens 1 is sucked by a suction nozzle by sucking the suction surface 110, 210 of the lens 1 and placed on the light source board 3, 33 accurately, so that the light emitting units 2 in the same group are placed in different light source cavities 100 respectively. Finally, the lens 1 and the light source board 3, 33 are bonded and fixed to complete the whole assembly process.

In this way, the light distribution structure of a group of light emitting units 2 can be assembled at the same time in one suction and attachment process, so that the assembly time of the lenses can be greatly saved. In the present example, the arrangement and number of the light distribution portions 10 can be adjusted according to the suction weight of the suction nozzle and the distribution of the light emitting units. The weight of a single lens 1 should not exceed the maximum weight that the suction nozzle can suck. Generally, the number of light distribution portions 10 in one lens 1 is about 2 to 3, or it can be expanded to more than 3, and a suction nozzle with higher power or suction force can be used.

In the case where the lens 1 includes two light distribution portions 10, the two light distribution portions 10 are basically symmetrically arranged on both sides of the suction portion 11 (see FIGS. 1-5). In the case where the lens 1 includes three light distribution portions 10, the three light distribution portions 10 can be arranged around the suction portion 21 in the circumferential direction. And the three light distribution portions 10 can be arranged in uniform and equal spacing (equilateral triangle arrangement, see FIGS. 7-9), isosceles triangle arrangement or irregular arrangement.

The whole lens 1 has a thickness direction. The light distribution portion 10 includes a base 104, 204 and a light distribution cover 105. The light distribution cover 105 is arranged on the base 104, 204 along the thickness direction. In this case, the bonding surface 102, 202 is a surface of the base 104, 204 facing away from the light distribution cover 105, and the light exiting surface 103 is the outer surface of the light distribution cover 105. The light source cavity 100 usually passes through the base 104, 204 from the bonding surface 102, 202 to inner side of the light distribution cover 105. Because the light exiting surface 103 is used for light distribution, it has a predetermined surface shape, and a connection edge 106 is formed between the light exiting surface 103 and the base 104, 204 as a boundary. The suction portion 11, 21 is fixedly connected with the base 104, 204, and the suction surface 110, 210 should not exceed the connection edge 106 in the thickness direction, so that the suction portion 11, 21 will not block the light emitted from the light exiting surface 103, and thus will not affect the light emitting effect.

Because the suction nozzles in the related art have been able to suck various surface shapes, the suction surface 110, 210 in the present example can adopt various surface shapes suitable for suction. However, considering the convenience of manufacturing and suction stability, the suction surface 110, 210 is preferably a planar surface. Moreover, the suction surface 110, 210 can be flush with the connection edge 106 to further reduce the manufacturing difficulty. On this basis, in the present example, the suction portion 11, 21 can keep the same thickness as the base 104, 204, so that the suction portion 11, 21 can keep flush with the bonding surface 102, 202, thus increasing the bonding area between the lens 1 and the light source board 3, 33, and improving the assembly stability.

In the present example, the light distribution portions 10 in the lens 1 can have the same surface shape and the same light distribution effect, or can have different surface shapes and different light distribution effects. For example, the light emitting units 2 in each group can have different color temperatures. In this case, different surface shapes can be adopted for the light distribution portions 10, so that the light distribution portions 10 of the lens 1 can form an overall composite light distribution effect.

Therefore, the assembly accuracy of the lens 1 and the light source board 3, 33 is also very important. In the present example, in order to improve the assembly accuracy of the lens 1 and the light source board 3, 33, positioning elements 12, 22 can be arranged on the lens 1, and the positioning elements 12, 22 are arranged on the bonding surfaces 102, 202 of a plurality of bases 104, 204 to fully disperse and improve the positioning effect. The positioning element 12, 22 can be a positioning structure, such as a positioning groove (see FIGS. 1-3 and FIGS. 7-9), or a positioning pillar (see FIGS. 4 and 5). At the same time, a matching positioning structure (not shown in the figure) corresponding to the positioning element 12, 22 can be arranged on the light source board 3, 33 to match with the positioning element 12 for positioning. The positioning elements 12 can be arranged in various ways, such as axisymmetric arrangement, central symmetrical arrangement or circumferential uniform arrangement, with respect to the suction portion 11, and in the case where it is necessary to clearly distinguish different light distribution portions 10, the positioning elements 2 can also be arranged asymmetrically.

Figure 2:
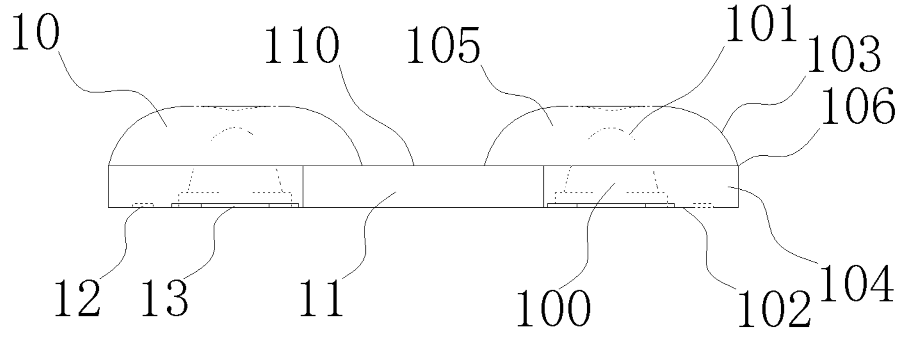
FIG. 2 is a side structural view of the lens shown in FIG. 1 with a perspective effect.
Figure 3:
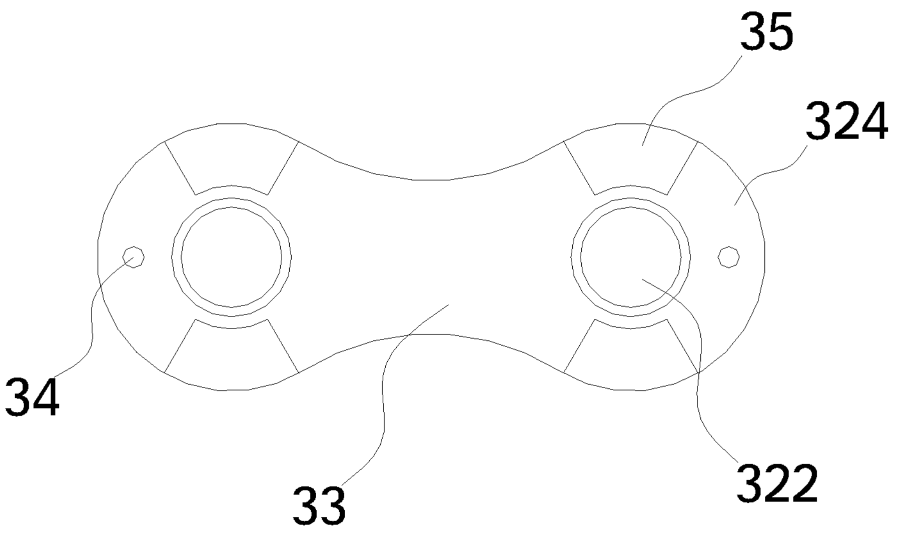
FIG. 3 is a bottom structural view of the lens shown in FIG. 1.
Figure 4:
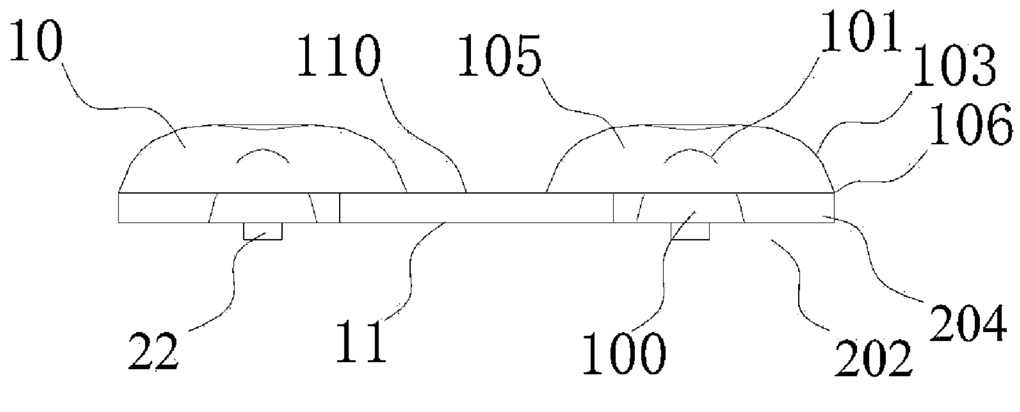
FIG. 4 is a side structural view of another lens with two light distribution portions with a perspective effect disclosed in the examples of the present disclosure.
Figure 5:
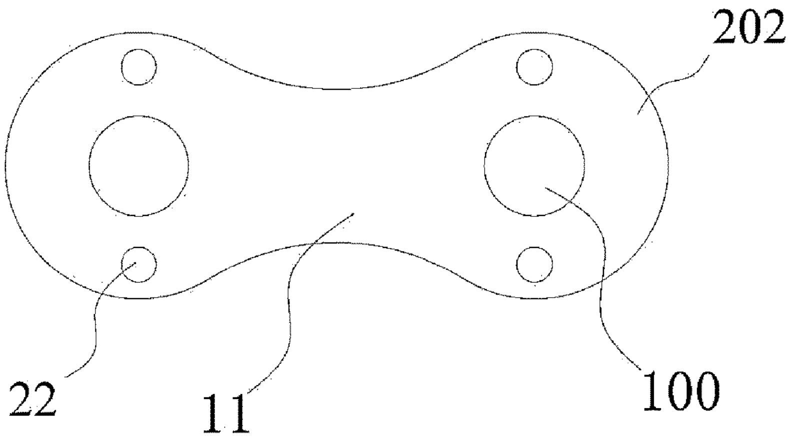
FIG. 5 is a bottom structural view of the lens shown in FIG. 4.

In addition, please continue to refer to FIGS. 2 and 3, the lens provided by the present example can also be provided with adhesive receiving grooves 13 on the bonding surface 102 to receive adhesive, so that the bonding surface 102 can be stably bonded with the light source board 3, 33.

To sum up, the lens and the light source module provided by the examples of the present disclosure can greatly save the assembly time of the lens.

The examples of the present disclosure provide a lens and a light source module.

In the first aspect, the examples of the present disclosure provide a lens, including a suction portion and at least two light distribution portions.

Each of the light distribution portions is configured to distribute light for a light emitting unit independently, and a plurality of light distribution portions are arranged around the suction portion with the suction portion as a center and are fixedly connected with the suction portion.

Each of the light distribution portions is provided with a light source cavity, a bonding surface and a light exiting surface, and the bonding surface and the light exiting surface face away from each other, the light source cavity is a recess recessed in a direction from the bonding surface to the light exiting surface, the suction portion is provided with a suction surface, and the light exiting surface and the suction surface face toward a same direction.

Optionally, in the above-mentioned lens, the lens has a thickness direction, the light distribution portion includes a base and a light distribution cover, the light distribution cover is arranged on the base along the thickness direction, the bonding surface is a surface of the base facing away from the light distribution cover, the light exiting surface is an outer surface of the light distribution cover, a connection edge is formed between the light exiting surface and the base, the suction portion is fixedly connected with the base, and the suction surface does not exceed the connection edge in the thickness direction.

Optionally, in the above-mentioned lens, the suction surface is a planar surface.

Optionally, in the above-mentioned lens, the suction surface is flush with the connection edge.

Optionally, in the above-mentioned lens, the suction portion is consistent with the base in thickness.

Optionally, in the above-mentioned lens, the lens further includes a plurality of positioning elements, and the plurality of positioning elements are arranged on a plurality of bonding surfaces.

Optionally, in the above-mentioned lens, the plurality of positioning elements are arranged axially symmetrically, centrally symmetrically or evenly in a circumferential direction with respect to the suction portion.

Optionally, in the above-mentioned lens, the lens further includes a plurality of adhesive receiving grooves, the plurality of adhesive receiving grooves are arranged on a plurality of the bonding surfaces.

Optionally, in the above-mentioned lens, two light distribution portions are provided, and the two light distribution portions are symmetrically arranged on both sides of the suction portion.

Optionally, in the above-mentioned lens, three light distribution portions are provided, and the three light distribution portions are arranged around the suction portion in a circumferential direction.

In the second aspect, the examples of the present disclosure provide a light source module, including a light source board, light emitting units and the lens, the light emitting units are arranged on the light source board in groups, and the light emitting units in each group are in one-to-one correspondence with the light distribution portions in one lens, and the bonding surfaces are attached to the light source board and the light emitting units in a same group are respectively placed in different light source cavities.

The above-mentioned at least one technical solution adopted by the examples of the present disclosure can achieve the following beneficial effects.

For the lens and the light source module disclosed in the examples of the present disclosure, a plurality of light distribution portions are connected so as to be fixed with a same suction portion, the assembly of the light distribution structure of a plurality of light emitting units can be completed at the same time in one suction and attachment process, so that the assembly time of the lenses can be greatly saved.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above examples of the present disclosure focus on the differences among various examples. As long as there is no contradiction between different optimization features among various examples, they can be combined to form a better example. Considering the brevity of description, they will not be repeated here.

What have been described above are merely examples of the present disclosure, and are not intended to limit the present disclosure. Various modifications and changes can be made in the present disclosure for those skilled in the art. Any modification, equivalent substitution, improvement, and the like, made within the spirit and principle of the present disclosure should be within the scope of the present disclosure.

What is claimed is:

1. A lens comprising:

a suction portion including a suction surface configured to be sucked by a suction nozzle, and three light distribution portions, each of the three light distribution portions configured to distribute light independently, each of the three light distribution portions including a bonding surface and a light exiting surface facing away from each other, and a light source cavity recessed in a direction from the bonding surface to the light exiting surface;

wherein the three light distribution portions are fixedly connected with the suction portion and arranged around the suction portion laterally in circumferential directions by taking the suction portion as a center, the three light distribution portions are arranged in an equilateral triangle, and the light exiting surface and the suction surface face in a same direction, wherein the three light distribution portions are configured to be placed on a light source board by the suction nozzle;

wherein the light distribution portion comprises a base and a light distribution cover, and the light source cavity passes through the base from the bonding surface to an inner side of the light distribution cover; and wherein light exiting surfaces of the three light distribution portions have different shapes corresponding to three light emitting units with different color temperatures, such that the three light distribution portions form a composite light distribution effect.

2. The lens according to claim 1, further comprising a plurality of adhesive receiving grooves, wherein the plurality of adhesive receiving grooves are arranged on the bonding surfaces.

3. The lens according to claim 1, further comprising a plurality of positioning elements, wherein each of the bonding surfaces includes at least one of the plurality of positioning elements.

4. The lens according to claim 3, wherein the plurality of positioning elements is arranged axially symmetrically, centrally symmetrically or evenly in a circumferential direction with respect to the suction portion.

5. The lens according to claim 1, wherein the lens has a thickness direction, the light distribution cover is arranged on the base along the thickness direction, the bonding surface is a surface of the base facing away from the light distribution cover, the light exiting surface is an outer surface of the light distribution cover, a connection edge is formed between the light exiting surface and the base, the suction portion is fixedly connected with the base, and the suction surface does not exceed the connection edge in the thickness direction.

6. The lens according to claim 5, wherein the suction surface is a planar surface.

7. The lens according to claim 6, wherein the suction surface is flush with the connection edge.

8. The lens according to claim 7, wherein the suction portion is consistent with the base in thickness.

9. A light source module comprising:

a plurality of lenses, each lens of the plurality of lenses including:

a suction portion including a suction surface configured to be sucked by a suction nozzle;

light distribution portions arranged around the suction portion with the suction portion as a center, each light distribution portion includes a bonding surface and a light exiting surface facing away from each other, and a light source cavity recessed in a direction from the bonding surface to the light exiting surface;

wherein the light distribution portions are fixedly connected with the suction portion and arranged around the suction portion laterally in circumferential directions by taking the suction portion as a center, and the light exiting surface and the suction surface face in a same direction;

a light source board, wherein the light distribution portions are configured to be placed on the light source board by the suction nozzle; and light emitting units arranged on the light source board in groups, different groups corresponding to different lenses of the plurality of lenses;

wherein each light emitting unit in each group are in one-to-one correspondence with the light distribution portions of one lens and the light emitting units in a same group are respectively placed in different light source cavities of a same lens, with the light distribution portions configured to distribute light for a light emitting unit independently, and the groups of the light emitting units are uniformly arranged in a straight line or in a circular ring on the light source board;

wherein the light distribution portion comprises a base and a light distribution cover, and the light source cavity passes through the base from the bonding surface to an inner side of the light distribution cover; and wherein light exiting surfaces of the light distribution portions have different shapes corresponding to the light emitting units with different color temperatures, such that the light distribution portions form a composite light distribution effect.

10. The light source module of claim 9, wherein the lens includes three light distribution portions, and the three light distribution portions are arranged in an equilateral triangle.

* * * * *